United States Patent [19]

Holyoak

[11] 4,301,996
[45] Nov. 24, 1981

[54] SNAKE GUARD

[76] Inventor: Hugh K. Holyoak, Rte. 1, Alapaha, Ga. 31622

[21] Appl. No.: 51,791

[22] Filed: Jun. 25, 1979

[51] Int. Cl.³ .............................................. E04H 17/00
[52] U.S. Cl. .......................................... 256/1; 256/23; 256/45; 43/10
[58] Field of Search ...................... 43/10, 7; 256/1, 45, 256/23

[56] References Cited

U.S. PATENT DOCUMENTS 1,764,284  6/1930  Barton ...................................... 256/1
3,165,853  1/1965  Ansell ........................................ 43/7

FOREIGN PATENT DOCUMENTS 27544 of 1907 United Kingdom ...................... 43/7
1416545 12/1975 United Kingdom .................. 256/45

Primary Examiner—Andrew V. Kundrat
Attorney, Agent, or Firm—Newton, Hopkins & Ormsby

[57] ABSTRACT

A method and apparatus for ensnaring a reptile having overlapping scales or plates over its body including flexible netting across the path of travel of the reptile, the netting having a mesh of sufficient size to allow at least the head portion of the reptile to enter therethrough and being constructed of a fabric which is of sufficient size so as to be wedged between the scales when the reptile attempts to withdraw its head from the netting.

2 Claims, 3 Drawing Figures

SNAKE GUARD

BACKGROUND OF THE INVENTION

1. Field of the Invention

This invention relates generally to the control of reptiles and, more particularly, to a method and apparatus for ensnaring reptiles.

2. Description of the Prior Art

Many reptiles, and specifically snakes, are harmful to man. The common poisonous North American species are the rattlesnake, the coral snake, the water moccasin and the copperhead snakes. It has always been difficult for the homeowner or the camper to protect his home, garden or campsite from snake infestation.

In the past, snake traps have included poisons or required electricity or utilized a bait. Thus, those traps were capable of injuring other animals, including humans. Also, they were difficult to install and required a lot of maintenance.

SUMMARY OF THE INVENTION

The above disadvantages are overcome by the present invention which comprises a flexible, plastic netting and means for supporting the netting across the path of travel of the reptile. The netting has a mesh which is of a size small enough to allow only the forward or head portion of the reptile to pass therethrough. The diameter of the plastic fabric of the netting is such that as the reptile attempts to reverse its direction of movement and extricate itself from the netting, the fabric slides between some of the overlapping scales on the body of the reptile, preventing any further movement of the animal.

The support means includes a plurality of elongated posts, each post having two slots formed in its exterior surface, one of the slots being adjacent the top of the post and slanted downwardly, the other slot being located beneath the first slot and angled upwardly. Both slots are dimensioned to receive therein the netting fabric.

Short stakes are provided to anchor the bottom of the netting to the ground to prevent the reptile from passing beneath the netting. The stakes have an upwardly directed slot adjacent their upper end and have a bottom end which is adapted to be driven into the ground.

In its operation, the netting can be disposed about the perimeter of an area that is desired to be protected, such as a campsite, lawn, garden or pond or it can be erected so as to protect only a certain portion of the area. In the latter case, the netting can be set up in certain configurations, such as a T-shape or an L-shape. In either case, the netting is unrolled to the desired length, the posts are driven into the ground at selected intervals to the depth of the bottom slot, and the stakes are then set in the ground at predetermined distances between the posts to the point where the slot is flush with the ground.

The bottom edge of the netting is attached to the ground level slots in the posts and stakes which are then further driven into the ground to secure the bottom edge of the netting snugly against the ground. The top or free edge of the netting is then attached to the upper slots in the posts.

Those reptiles which approach the netting and are too large to fit within the openings will thus be driven off. The reptiles which can fit their heads through the netting will attempt to continue to move forward, thereby tightening the netting about their bodies. When they try to back out, the scales on their bodies will hook on the netting fabric, making it impossible for the reptile to go backward or forward. The reptile is held within the netting until it is released or is killed.

It is, therefore, the primary object of the present invention to provide a method and apparatus for ensnaring reptiles which is safe and efficient.

Another object of the present invention is to provide a means for ensnaring reptiles which is effective only against reptiles and is harmless for other animals, including humans.

A further object of the present invention is to provide a method and apparatus for ensnaring reptiles which requires no bait or electricity to operate, is easy to install and needs little maintenance.

DESCRIPTION OF THE PREFERRED EMBODIMENT

Figure 1:
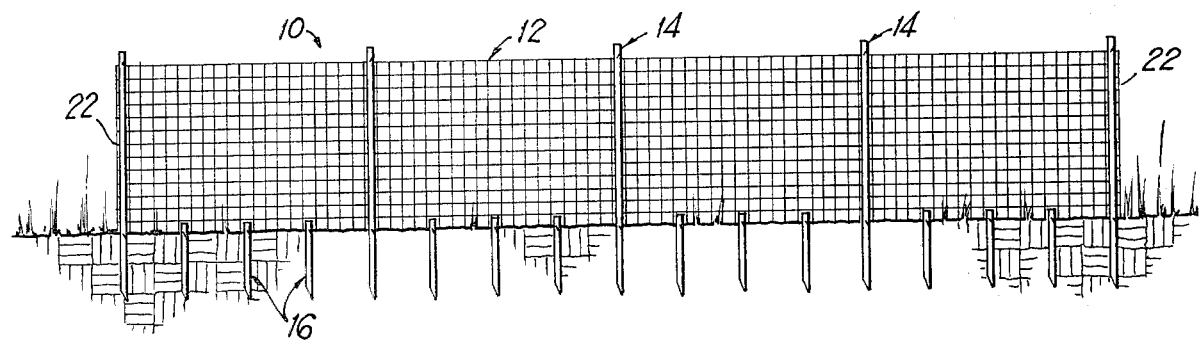
FIG. 1 is a front elevational view of the present invention in its installed mode.

Referring to FIG. 1 of the drawing, the numeral 10 denotes generally the present invention which comprises a netting 13, posts 14 and stakes 16. The netting 12 is constructed of a flexible plastic fabric having an open mesh and includes horizontal top bottom edges 18, 20 and opposed, vertical sides 22. The preferred color of the fabric is black.

The netting 12 is comprised of a network of interconnected horizontal and vertical strands 24, 26 which define yieldable openings 28. The preferred size of openings 28 ranges from ¼ to 2 inches, depending on the size of reptiles prevalent in the particular area of the country in which the invention 10 is utilized. The height of netting 12 may range from 1 inch to 36 inches, with the most common height being 12 inches.

Figure 2:
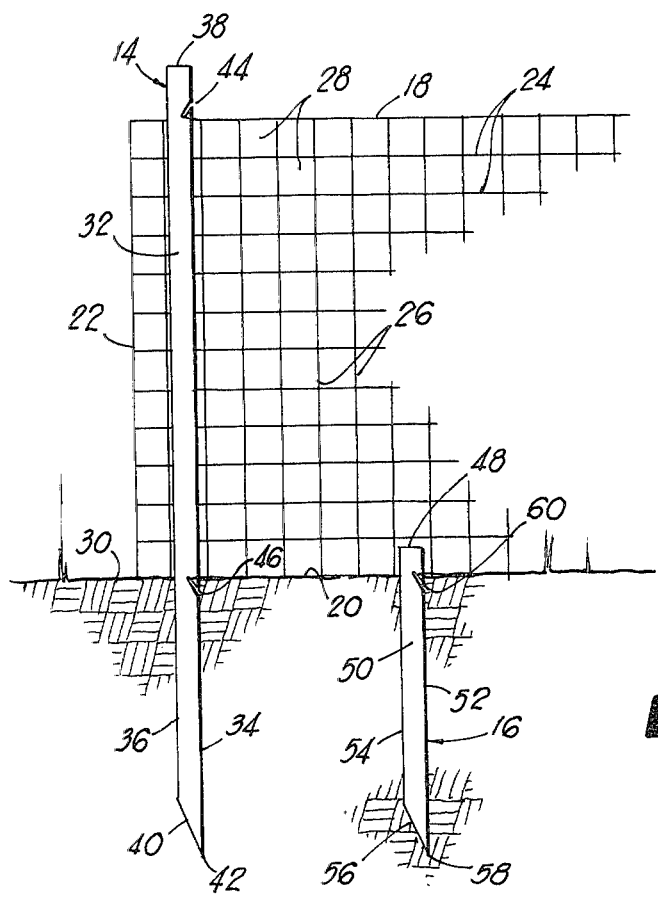
FIG. 2 is a detailed, fragmentary front elevational view of the present invention.

The netting 12 is supported in a generally vertical plane above the ground 30 by means of the posts 14, one of which is shown in detail in FIG. 2. Post 14 is an elongated member which has a length that is greater than the height of netting 12 and which may be constructed of any suitable material, such as metal, wood or plastic. The preferred configuration of the posts 14 is rectangular in cross-section but it may also be circular and the usual height is at least 16–18 inches.

The post 14 includes opposed, parallel, vertical side walls 32, front and back walls 34, 36, flat top 38 and bottom 40 which slopes downwardly from back wall 36 to front wall 34 to terminate in point 42. A first slot 44 is laterally disposed through front wall 34 adjacent top 38 and is directed downwardly. A second slot 46 is cut through front wall 34 below the midpoint of the post 14 and is directed upwardly. Both slots 44, 46 are dimensioned to receive therein the horizontal strands 24. The distance between the slots 44, 46 corresponds generally to the vertical distance between top edge 18 and bottom edge 20.

The stakes 16 are of the same general construction as the post 14, except that the height of a stake 16 is about 4–6 inches. A stake 16 includes a flat top 48, vertical and parallel side walls 50 and opposed front and rear walls 52, 54. Bottom surface 56 slopes downwardly from rear wall 54 towards front wall 52 and terminates in point 58. An upwardly directed slot 60 laterally extends across front wall 52 adjacent top 48.

In its operation, the present invention 10 should be placed on fairly open ground in order to function effectively. If the placement area is wooded or grassy, a small right-of-way must be prepared with a sling or a mower.

The netting 12 is unrolled and placed flat upon the ground 30 across the expected path of travel of a snake 62 having overlapping scales 64 covering its body. Along the bottom edge 20 of the netting 12, the posts 14 are driven into the ground 30 to a depth of the second or bottom notch 46 at four foot intervals. At each one-foot interval between adjacent posts 14, the stakes 16 are driven into the ground 30 so that the notch 60 is flush with the ground.

The bottom edge 20 of the netting 12 is then attached to the ground level notches 46, 60 and, as shown in FIG. 2, the posts 14 and stakes 16 are driven further into the ground 30 to secure the edge 20 snugly against the ground 30. The top edge 18 of the netting 12 is raised and secured within the first or uppermost notches 44 in the posts 14. The netting 12 should be kept smooth and taut along its length. The assembled invention 10 will appear as shown in FIG. 1.

It is imperative that the bottom edge 20 of the netting 12 be kept flush with the ground 30 in order to prevent a snake 62 from passing beneath the netting 12. If the netting 12 is installed in rough, uneven terrain, it may be necessary to pile dirt along the bottom edge 20.

Figure 3:
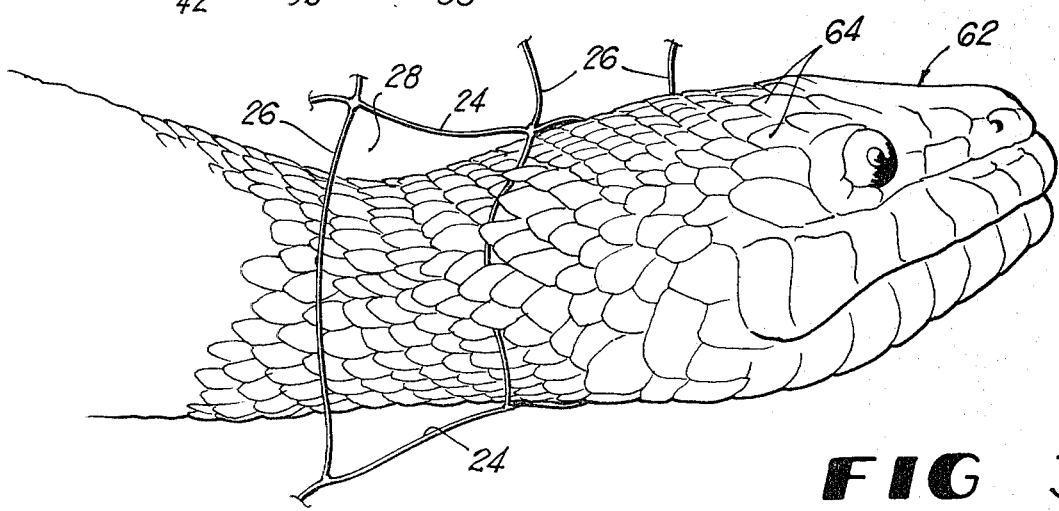
FIG. 3 is a partial perspective view of a reptile ensnared in the netting of the present invention.

The natural instinct of a snake when it comes into contact with the netting 12 is to go through and not around it. A very large snake 62 will not be able to insert its head into an opening 28 and will be driven away from the area protected by the invention 10. A snake 62 has a head or forward body portion which is of a size to fit within opening 28 will continue to push forward through the opening 28 until it cannot proceed any further due to the dimensions of opening 28. The snake 62 will then attempt to back out of opening 28 causing the horizontal and vertical strands 24, 26 which define an opening 28 to slide between overlapping scales 64, restricting the snake 62 from moving either forwards or backwards, as shown in FIG. 3. From that point on, the snake 62 is held in captivity by netting 12 until it is released or killed. Because of the strain imposed on the strands 24, 26 of the netting 12 by the movement of the snake 62, the tensile strength of the strands 24, 26 should be sufficiently high.

Snakes move into areas where ponds are located in search of food—fish, frogs, lizards, and insects—and water. They circle the banks of the pond, occasionally moving into the water at one place and out at another. Fairly complete protection can be achieved by encircling the pond with the invention 10 but a cheaper and almost as effective a method involves simply erecting several T-shaped units of the invention 10 at intervals around the pond. This use of separate sections of netting 12 works because snakes, pit vipers in particular, have limited vision and depend on their ability to sense warmth in order to spot their prey. When they encounter the netting 12, they do not attempt to go over or around it but through it because they do not see that it is a trap. Once they have entered the netting 12, all further movement serves only to secure them more tightly; they cannot escape by backing out.

In a small pond consisting of only a few acres, one T-section of netting 12 in each corner may give adequate protection, but if the pond is larger, T-sections may need to be installed every 100 to 300 feet apart. Distance between sections would depend on severity of infestation and habitat. The top of each T-section may be placed straight across the base and perpendicular to it or curved in a sort of half moon shape with the base intersecting the curved section midway its length and with the curved ends pointing toward the base. The perpendicular base line must be so placed that it actually enters the water even when the water is at its lowest point.

The presence of certain other conditions may call for additional T-sections of the present invention. Since snakes migrate to open areas from nearby woods, rivers or streams, the pond owner can prevent many snakes from ever getting into his ponds by erecting the invention 10 in such areas where woodlands touch on or streams enter his openland or pond area. If his pond is fed by a dammed stream, he will need to install the netting 12 above and below the dam as snakes travel up as well as down stream. Grass, trash and fallen limbs make excellent hiding places for snakes, so T-sections should be placed appropriately near such debris or vegetation. Piers, boathouses, and docks also provide numerous places for snakes to hide. In such places, the netting 12 can be stretched in any number of ways to suit the situation and need not be limited to the T-method of installation. The pond owner knows his own pond from observation and can determine whether to set up the netting 12 in relation to specific trouble areas.

If the farmer wishes to protect his garden or field from snake infestation, he must install the present invention 10 in one of two ways. If the open area to be protected is surrounded on all sides by woods, or other snake habitats, then the netting 12 must be installed so as to encircle the garden or field, for snakes are often transient in such areas and move straight through rather than back and forth in the more or less circular way they move around ponds. If the area to be protected has habitat on one, two or three sides, then variations of the L-method will suffice: a section -shaped for one exposed side; -shaped for two exposed sides; -shaped for three exposed sides. The netting 12 should be installed around the edges of the cleared area near the woods, or the fence row, or the stream/lake/pond bank rather than close up on the cultivated area.

Around lawns, the homeowner should use essentially the same method to protect his lawn and flowerbeds as the farmer protecting his garden or field. Around a home, however, it is particularly important that the beauty of the setting not be spoiled, so the invention 10 should be installed along the outer edge of flowerbeds or lawn borders in order to be both effective and nearly invisible due to the black color of the strands 24, 26. Extra care needs to be taken where the lawn or flowerbed adjoins a snake habitat. If infestation is severe, the homeowner might need to actually encircle his yard with the netting 12.

What I claim is:

1. Apparatus for protecting an area from intrusion by a snake, comprising:

(a) a length of flexible netting; and (b) means for supporting said netting from the ground in an upward direction across the expected path of movement of said snake into said area, said netting having a mesh of sufficient size so as to allow only a limited amount of the forward portion of said snake to pass therethrough and said netting being constructed of fabric of sufficient thickness so as to be wedged between some of the overlapping scales on said reptile when said reptile attempts to extricate itself from said netting, said support means includes a plurality of elongated posts, each post having a vertical exterior surface, a bottom and a top, said bottom being capable of being implanted in the ground to present said post in an upwardly extending attitude and means for attaching said netting to said post, said attaching means includes a first slot laterally extending through said vertical exterior surface adjacent said top end, and being angled downwardly and a second slot laterally extending through said vertical exterior surface and spaced below said first slot, said second slot being upwardly directed, said first and second slots dimensioned to receive said fabric therein.

2. Apparatus for protecting an area from intrusion by a snake, comprising:

(a) a length of flexible netting; and
(b) means for supporting said netting from the ground in an upward direction across the expected path of movement of said snake into said area, said netting having a mesh of sufficient size so as to allow only a limited amount of the forward portion of said snake to pass therethrough and said netting being constructed of fabric of sufficient thickness so as to be wedged between some of the overlapping scales on said reptile when said reptile attempts to extricate itself from said netting, said support means includes a plurality of elongated posts, each having a vertical exterior surface, a bottom and a top, said bottom capable of being implanted in the ground to present said post in an upwardly extending attitude and means for attaching said netting to said post, and peg means having a vertical face, a bottom and a top, said peg means being shorter in length than said posts and said bottom being adapted to be driven into the ground, said peg means having a slot laterally extending through said vertical face adjacent said top, said slot being angled upwardly and being dimensional to receive said fabric therein so as to maintain the bottom of said netting in abutting engagement with the ground.

* * * * *